Feb. 23, 1932.　　　D. B. DIMICK　　　1,846,996
MOLDING FLASK
Original Filed Oct. 23, 1929　2 Sheets-Sheet 1
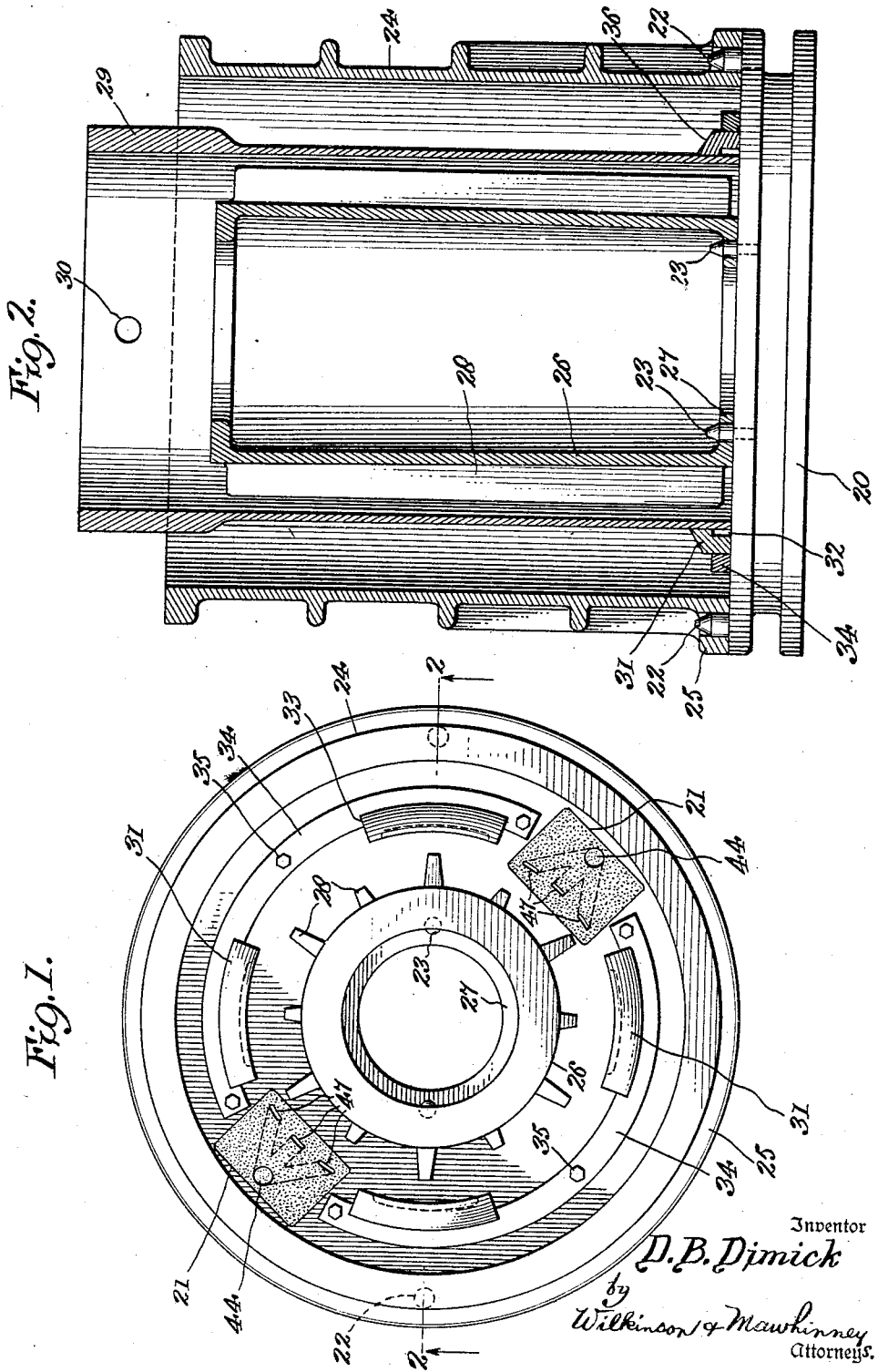

Feb. 23, 1932. D. B. DIMICK 1,846,996
MOLDING FLASK
Original Filed Oct. 23, 1929  2 Sheets-Sheet 2
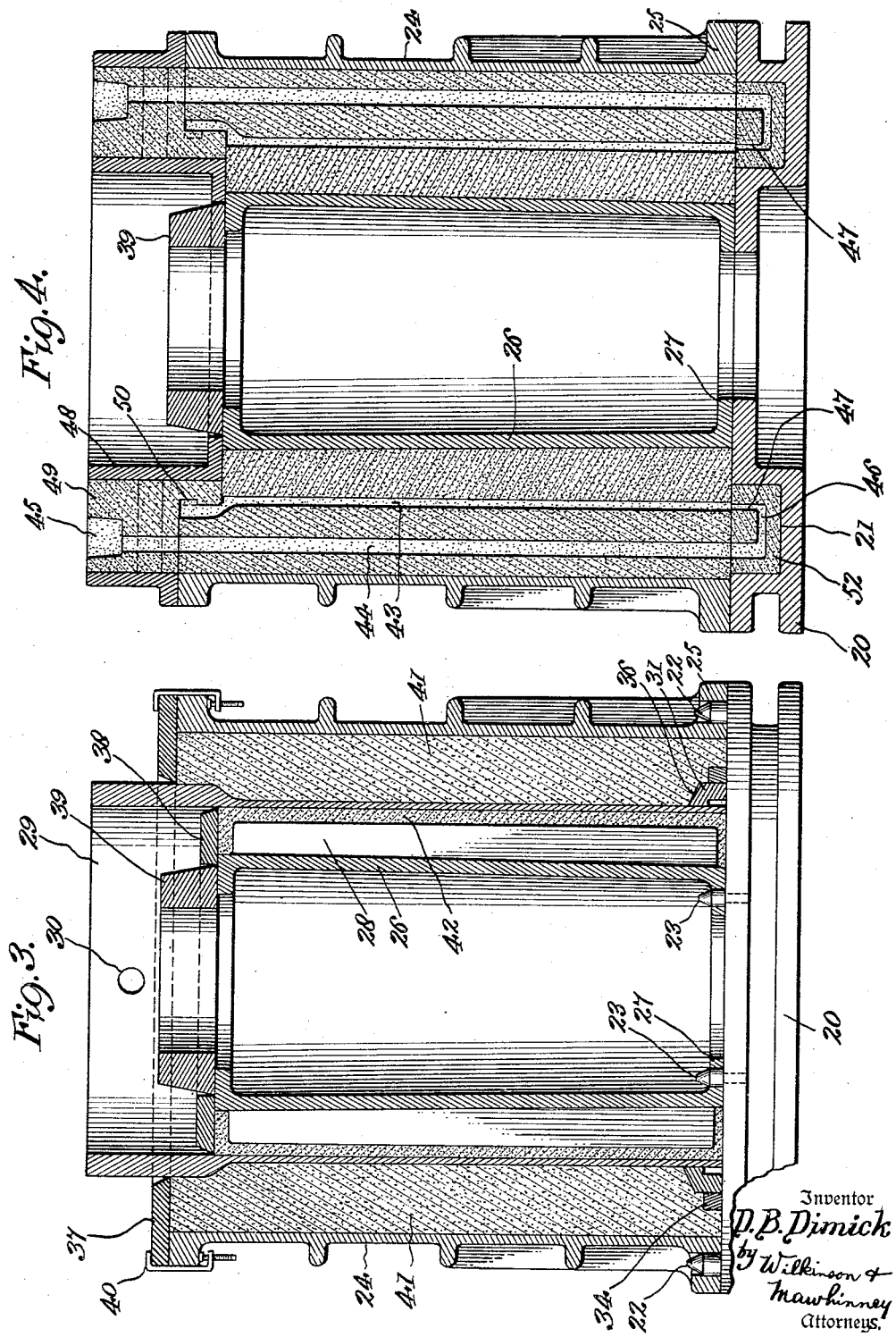

Patented Feb. 23, 1932

1,846,996

UNITED STATES PATENT OFFICE

DANIEL BAKER DIMICK, OF BIRMINGHAM, ALABAMA

MOLDING FLASK

Original application filed October 23, 1929, Serial No. 401,767. Divided and this application filed November 15, 1930. Serial No. 495,973.

The present invention relates to improvements in molding flasks, and is a division of my copending application, Serial No. 401,767, filed October 23, 1929, entitled Method of and apparatus for casting pipe.

An object of the invention is to provide an improved molding flask for the manufacture of cast iron lock joint culvert pipe, in which the pipe will be produced of uniform thickness.

Another object of the invention is to provide an improved molding flask for the manufacture of cast iron culvert pipe having locking keys for effecting a lock joint between adjacent pipe sections, in which a high degree of accuracy and uniformity in the size, thickness and other dimensions of the pipe and keys is had.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a top plan view of the empty flask, showing the component parts to make up said flask and their relation to one another, and with the spigot key chill members in place ready to receive the pattern.

Figure 2 is a vertical section taken on the line 2—2 in Figure 1, and with the pattern shown in place.

Figure 3 is a vertical central section of the complete flask mold with stripping plates in place ready for the pattern to be withdrawn, and Figure 4 is a vertical sectional view of the complete mold ready for bottom pouring of the pipe.

Referring more particularly to the drawings, 20 designates a casting stool, which constitutes the bottom of the flask. As shown in Figures 1 and 4, the casting stool may be provided with one or more pockets 21 therein to center and hold the bottom pour gate cores, when used. The casting stool 20 is also drilled to receive the check centering pins 22 and the arbor centering pins 23. The cheek is designated at 24 and constitutes the outside retaining wall of the flask, the same being machined to the length of the pipe mold desired. The cheek 24 is provided with a perforated flange 25 at its lower portion to receive the centering pins 22. These pins retain the cheek in proper concentric relation with the stool 20. The core arbor is designated at 26 and is provided with the perforated flange 27 to receive the centering pins 23. This arbor 26 is machined to the length of the straight bore of the pipe mold desired.

The pins 23 are located concentrically with the center of the flask. The core arbor 26 may be provided with wings 28 to support and hold the molding sand in place in the core of the finished mold.

The pattern is shown at 29. This pattern is constructed for the straight bore of the desired pipe and also for the outside of the bell of said pipe. The top portion of the pattern 29 is extended to receive means for withdrawing the pattern from the flask mold, and for this purpose, openings 30 are provided in the upper extended portion of the pattern.

At 31 are shown cast iron spigot end taper locking key chills, the inside surface of each being formed to the radius of the outside of the pattern. A cavity 32 is provided in the inner surface of each chill having the size and form of the desired spigot end taper locking key for its respective pipe pattern. The chills 31 are received into recesses 33 provided in the sectional cast iron spigot key chill rings 34, which are securely attached to the casting stool as by the screws or bolts 35 in such manner and in such relation to the center of the flask as to hold the inside surfaces of the spigot key chills, and thereby the pattern 29, concentric with the flask.

The parts are such as to hold the spigot key chills 31 in place against the pressure of the molding sand after the withdrawal of the pattern and for this purpose the upper edges of the chills 31 are sloped as indicated at 36 whereby to deflect the pressure of the sand outwardly.

Referring to Figure 3, 37 designates the outer stripping plate machined in bore to the outside diameter of the top or enlarged bell end of the pattern 29. The inside stripping plate is represented at 38. This inside stripping plate is machined on its outer diameter to the bore of the pattern. A weighted or massive cast iron centering plug 39 rests upon the arbor 26 within the inner stripping ring or plate 38.

The engaging surfaces of the plug 39 and stripping plate 38 are properly machined and the outside surface of the plug 39 is preferably tapered as shown. The outside stripping plate 37 is held in place by the use of clamps 40 in a well known manner. The tempered molding sand rammed in place between the pattern 29 and cheek 24 is represented at 41 and the same between the pattern 29 and the arbor 26 is shown at 42. After the withdrawal of the pattern, a mold cavity 43 is left in the sand, as shown in Figure 4.

As shown in Figure 4, 44 designates a pouring gate cavity made in the rammed molding sand as a restricted path for the molten iron to travel from the pour basin 45 to the casting stool core gate.

As shown in Figures 1 and 4, the lower end of this pouring gate cavity 44 communicates with one or more horizontal gate cavities 36 and similar connecting vertical cavities 47, which latter communicate with the lower end of the mold cavity 43. A runner box is shown in Figure 4 as being in place on the flask.

The runner box is indicated at 48 in Figure 4 and contains the tempered molding sand 49 when rammed to the shape and size desired to make a combined bell core and pour basin. At 50 are shown the impressions made in the bell core by the bell locking key patterns, leaving cavities of the size and in the positions desired for bell locking keys.

The dry sand gate cores 52 are placed in the cavities or pockets 21 of the casting stool 20 whenever the molten metal is to be poured into the bottom of the mold cavity 43, as shown in Figure 4.

In the use of the device, referring to Figures 1 and 2, the casting stool 20 is carefully bored so that the openings for the pins 22 are equidistant from the center. In like manner, the inner pins 23 for the arbor are also equi-distant from the center of the casting stool.

Care is also taken in the formation of the cheek 24 to machine it so that it will be concentric and properly receive the pins 22, whereby such cheek 24 is accurately concentric with the casting stool. The core arbor 26 is also machined carefully and extends up to the bell line. Care must be taken to have the arbor 26 concentric both with the casting stool 20 and with the flask or cheek 24. The wings 28 on the core arbor 26 are for the purpose of supporting the sand in the core and the arbor is preferably made with the barrel tapered, and with the small end down to facilitate removal from the pipe. The sectional spigot key chill rings 34 are bolted to the upper surface of the casting stool 20, and are so centered that, when the spigot key chills 31 are in place, the inside curved surfaces of the chills 31 form sections of a circle concentric with respect to the vertical axis of the casting stool and of the same radius as that of the outside of the pattern 29.

The pockets 33 in the rings 34 will restrain the chills 31 from movement in a horizontal plane. As the sand is rammed down against the beveled upper portions of the chills 31, they are made to press closely against the pattern 29.

The cavities 32 in the chills form mold cavities of the exact size and shape of the spigot locking keys desired.

The casting stool, cheek, core arbor, chill rings and chills, together with the centering pins, make up a complete flask. When the completed flasks are assembled, the cheeks 24 may be clamped by means, not shown, to the casting stools 20 for ease of handling by any suitable means.

When the flask is being assembled for a size and weight pipe requiring bottom pouring of the metal, dry sand gate cores 52, as shown in Figures 1 and 4, are placed in the pockets 21 in the casting stool 20, said cores being so placed that the small gate cavities 47, through which the metal is to enter the pattern cavity, are concentric with and will be covered by the pattern during ramming of the sand. When the flask is assembled for a size and weight of pipe requiring top pouring, these pour gate cores 52 are omitted, and the casting stool pockets 21 filled level full of sand, or a casting stool is used of the same form but with the gate core pockets eliminated.

The molding operation is started by placing a complete flask on the table of a molding machine. The pattern 29 is then lowered into the flask, being centered with respect to the flask and molding machine by the spigot key chills 31 and they in turn by the chill rings 34 fastened to the casting stool.

It has been found that certain sizes and weights of pipe may be made better when the tempered molding sand is rammed on a jarring machine or jolter. In this method, with the flask and pattern in place, together with the pattern for the gate 44 shown in Figure 4, when the mold is to be bottom poured, tempered molding sand is shoveled or spouted into the space between the cheek and pattern and into the space between the core arbor and pattern. The conventional jarring machine or jolter is so made that when compressed air is allowed to flow into the machine, the piston and table attached thereto, together with the flask and sand, are caused to be jarred or jolted and the sand thereby rammed.

Certain other sizes and weights are better molded by the sand slinger method. In this method, the flask and pattern are placed, as before, in a centered position on a turntable.

The table is caused to rotate and the flask and pattern are caused to rotate therewith true with the axis of rotation of the turn table.

While the table, flask and pattern are revolving, sand is thrown by the sand slinger into the space between the cheek and pattern and between the core arbor and pattern with such force that the sand is rammed to the density desired.

Upon completion of the above filling and ramming of the flask mold, the sand outside the pattern is leveled even with the top of the cheek 24, and the sand inside the pattern is leveled even with the top of the core arbor 26. The inside and outside stripping plates 37 and 38 are then put in place, the outside stripping plate 37 being clamped to the cheek 24. The centering plug 39 is also put in place. It will be remembered that the outside of the plug 39 is tapered, and the largest diameter is the same as the bore of the inside stripping plate 38.

As the pattern 29 is machined with inside and outside diameters concentric, and as the inside stripping plate 38 is machined with inside and outside diameters concentric, the largest outside diameter of the centering plug 39 must now be concentric with the outside diameter of the pattern 29.

The next operation is to remove the pattern from the flask mold, which is done by engaging suitable means in the openings 30 shown in Figures 2 and 3, and lifting the pattern out vertically.

After the pattern 29 is completely removed from the mold, the stripping plates 37 and 38 are likewise removed. The centering plug 39 is, however, left in place. Being of massive design, the centering plug 39 will not move during any careful handling of the mold and will remain central with the pattern impression by virtue of its mass alone. The completed flask molding is removed from the molding machine and placed on the pouring floor ready to receive the combined bell core and pour basin 48.

This bell core and pour basin are formed separately from the flask in a machine such as shown and described in my copending application aforesaid.

The combined bell core and pouring basin, as molded in the runner box 48, is now placed in the completed flask mold, being centralized as it is lowered therein by the centering plug 39, thus completing a bell mold of even thickness. The completed pipe mold is now ready for pouring.

After pouring, the runner box 48 is removed and returned to the bell core molding machine; the core arbor 26 is removed ready to be cleaned and replaced on any casting stool 20; the cheek 24 is removed ready to be cleaned and replaced on any casting stool 20; the pipe casting is removed for cleaning and finishing; the spigot key chills and chill ring and casting stool are cleaned; and the molding sand retempered ready for the making of another mold.

It will be noted that in all description of parts and through the explanation of the assembly of the several parts to make up the complete mold, particular emphasis has been placed on the fixed relativity of all component parts to a common vertical axis. This common relativity assures that all parts of the mold cavity, and therefore all parts of the completed pipe are concentric, and that the pipe as cast is even in thickness throughout.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A pipe molding organization including a casting stool having pockets to receive and locate gate cores concentrically with respect to the axis of a flask and a pattern.

2. A pipe molding organization comprising a casting stool having pins projecting upwardly therefrom, a cheek having openings received over and centered by certain of said pins, an arbor also having openings received over and centered by said pins, locking key chills on the casting stool between said cheek and core arbor, and a pattern fitting within said chills and centered thereby.

3. A pipe molding organization comprising a casting stool, a cheek erected upon said stool, a core arbor also erected upon said stool within the cheek, means between the casting stool and said cheek and core arbor for centering the parts relatively to one another, key chill rings secured to the casting stool between the arbor and cheek, key chills interlockingly engaged with said rings, and a pattern fitting between said arbor and cheek and against the inner sides of said chills.

4. A pipe molding organization comprising a casting stool, an arbor and a cheek on said stool, a pattern sliding between said arbor and cheek, key chill rings secured to said casting stool between the arbor and cheek and having recesses therein, and key chills fitting partially into said recesses and being centered by the rings.

5. A pipe molding organization comprising a casting stool having diametrically opposed pockets to receive and locate gate cores centrally with respect to the axes of the flask and pattern, arcuate key chill rings secured to the casting stool between said pockets, key chills centered with respect to said rings and supported upon the casting stool, a core arbor resting upon the stool within said pockets and rings and spaced therefrom, an outer cheek resting upon the casting stool without said pockets and rings and spaced therefrom, and a pattern adapted to fit between said core arbor and cheek and against said chills.

6. A pipe molding organization, for ramming, molding, finishing and pouring in one position with the bell up, comprising a flask for receiving the molding sand in which the molding cavity is formed, a pattern removably mounted in said flask with its spigot end down and its bell formation up, stripping rings engaged with the pattern, and a massive centering plug supported by the flask and centered by the inner stripping ring from the pattern.

7. A pipe molding organization comprising a casting stool, a core arbor centered thereon, a cheek located on said casting stool concentrically with the core arbor, a pattern centered on the stool between said core arbor and cheek, and stripping plates on the arbor and cheek within and without said pattern.

8. A pipe molding organization comprising a casting stool, a core arbor, a cheek, a pattern, means on the tool for concentrically locating the arbor, pattern and cheek, and removable stripping plates engaging the inside and outside of the upper portion of the pattern.

9. A pipe molding organization comprising a casting stool, a core arbor, a cheek, a pattern, means on the casting stool for concentrically locating thereon in fixed relative positions the core arbor, pattern and cheek, inner and outer stripping rings on the core arbor and cheek engaging said pattern, and a massive centering ring on the core arbor engaged and centered from the pattern through the inner stripping ring.

10. A pipe molding organization comprising a casting stool, a core arbor fixedly located on said stool, a cheek concentrically and fixedly located on the stool, rings fixed on the stool, chills centered and positioned against said rings, a pattern having its spigot end down upon said casting stool and centered and located by means of said chills, inner and outer stripping rings engaging the upper portion of the pattern and supported on the core arbor and cheek, and a massive centering device supported on the core arbor and centered from the pattern through the inner stripping ring.

11. A pipe molding organization comprising a casting stool, a core arbor, a pattern, a cheek, means between the casting stool on the one hand and the core arbor and cheek for fixing the same in true concentric positions on the casting stool, rings fixed on the casting stool, recessed chills on the casting stool located and centered by said rings and having upper inclined surfaces, a pattern having its spigot end down resting upon the casting stool and engaged and centered by said chills, inner and outer stripping rings on the core arbor and cheek engaging the upper portion of the pattern, and a massive centering ring supported on the core arbor and centered from the pattern through the inner stripping ring.

DANIEL BAKER DIMICK.